United States Patent
Gray (10) Patent No.: US 7,500,602 B2
(45) Date of Patent: Mar. 10, 2009

(54) SYSTEM FOR INCREASING THE SECURITY OF CREDIT AND DEBIT CARDS TRANSACTIONS

(76) Inventor: R. O'Neal Gray, 25 Highland Park Village, PMB 319, Dallas, TX (US) 75205

(*) Notice: Subject to any disclaimer, the term of this patent is extended or adjusted under 35 U.S.C. 154(b) by 355 days.

(21) Appl. No.: 11/061,616

(22) Filed: Feb. 22, 2005

(65) Prior Publication Data

US 2006/0186195 A1 Aug. 24, 2006

(51) Int. Cl.
G06K 5/00 (2006.01)

(52) U.S. Cl. .................. 235/380; 235/375; 235/381; 235/382; 235/449; 235/383; 235/492; 235/493; 705/50; 705/39; 705/44; 705/64

(58) Field of Classification Search .......... 235/449, 235/380, 379, 382
See application file for complete search history.

(56) References Cited

U.S. PATENT DOCUMENTS

| | | | |
|---|---|---|---|
| 4,614,861 A * | 9/1986 | Pavlov et al. ........... 235/380 |
| 4,701,601 A * | 10/1987 | Francini et al. ......... 235/449 |
| 5,140,517 A | 8/1992 | Nagata et al. |
| 5,317,636 A | 5/1994 | Vizcaino |
| 5,477,038 A * | 12/1995 | Levine et al. ........... 235/380 |
| 5,710,887 A | 1/1998 | Chelliah et al. |
| 5,711,012 A | 1/1998 | Bottoms et al. |
| 5,726,893 A | 3/1998 | Schuchman et al. |
| 5,890,137 A | 3/1999 | Koreeda |
| 5,913,202 A | 6/1999 | Motoyama |
| 5,955,961 A * | 9/1999 | Wallerstein ............. 340/5.4 |
| 5,960,411 A | 9/1999 | Hartman et al. |
| 5,991,749 A | 11/1999 | Morrill, Jr. |
| 6,070,154 A | 5/2000 | Tavor et al. |
| 6,088,683 A | 7/2000 | Jalili |
| 6,104,726 A | 8/2000 | Yip et al. |
| 6,138,917 A * | 10/2000 | Chapin, Jr. ............. 235/487 |
| 6,226,529 B1 | 5/2001 | Bruno et al. |
| 6,254,000 B1 * | 7/2001 | Degen et al. ........... 235/380 |
| 6,324,526 B1 | 11/2001 | D'Agostino |
| 6,378,075 B1 | 4/2002 | Goldstein et al. |
| 6,446,048 B1 | 9/2002 | Wells et al. |
| 6,473,500 B1 * | 10/2002 | Risafi et al. ......... 379/144.01 |
| 6,493,338 B1 | 12/2002 | Preston et al. |
| 6,598,031 B1 | 7/2003 | Ice |

(Continued)

FOREIGN PATENT DOCUMENTS

EP    1 331 582 A    7/2003

OTHER PUBLICATIONS

Mastercard International; Frequently Asked Questions About MasterCard® SecureCode™; 1994-2004, pp. 1-2.

(Continued)

*Primary Examiner*—Thien M. Le
*Assistant Examiner*—Tuyen K Vo
(74) *Attorney, Agent, or Firm*—Schwabe, Williamson & Wyatt, P.C.

(57) ABSTRACT

A system for facilitating a commercial transaction by a consumer includes a card or electronic storage device which includes a first number for identifying a financial account of the consumer and a second number, related to the first number, for use in authorizing a transaction involving the financial account of the consumer.

19 Claims, 5 Drawing Sheets

U.S. PATENT DOCUMENTS

| | | | |
|---|---|---|---|
| 6,607,127 B2 * | 8/2003 | Wong | 235/451 |
| 6,609,113 B1 | 8/2003 | O'Leary et al. | |
| 6,611,818 B1 | 8/2003 | Mersky et al. | |
| 6,615,183 B1 | 9/2003 | Kolls | |
| 6,636,833 B1 | 10/2003 | Flitcroft et al. | |
| 6,662,020 B1 | 12/2003 | Aaro et al. | |
| 6,690,681 B1 | 2/2004 | Preston et al. | |
| 6,749,114 B2 | 6/2004 | Madani | |
| 6,798,762 B1 | 9/2004 | Olson | |
| 6,805,287 B2 * | 10/2004 | Bishop et al. | 235/379 |
| 6,805,288 B2 * | 10/2004 | Routhenstein et al. | 235/380 |
| 6,839,692 B2 | 1/2005 | Carrott et al. | |
| 6,991,157 B2 | 1/2006 | Bishop et al. | |
| 7,090,123 B2 * | 8/2006 | Walker et al. | 235/380 |
| 7,292,999 B2 | 11/2007 | Hobson et al. | |
| 2001/0039535 A1 | 11/2001 | Tsiounis et al. | |
| 2002/0001317 A1 | 1/2002 | Herring | |
| 2002/0026519 A1 | 2/2002 | Itabashi et al. | |
| 2002/0049639 A1 | 4/2002 | Tanaka et al. | |
| 2002/0083008 A1 | 6/2002 | Smith et al. | |
| 2002/0128929 A1 | 9/2002 | Urabe | |
| 2002/0145043 A1 | 10/2002 | Challa et al. | |
| 2003/0001005 A1 * | 1/2003 | Risafi et al. | 235/380 |
| 2003/0014371 A1 | 1/2003 | Turgeon | |
| 2003/0028481 A1 | 2/2003 | Flitcroft et al. | |
| 2003/0066879 A1 | 4/2003 | Cummins | |
| 2003/0075610 A1 | 4/2003 | Ong | |
| 2003/0126076 A1 | 7/2003 | Kwok et al. | |
| 2003/0191945 A1 | 10/2003 | Keech | |
| 2003/0210708 A1 | 11/2003 | Belotserkovsky | |
| 2004/0019564 A1 | 1/2004 | Goldthwaite et al. | |
| 2004/0029569 A1 | 2/2004 | Khan et al. | |
| 2004/0090992 A1 | 5/2004 | Lee | |
| 2004/0097217 A1 | 5/2004 | McClain | |
| 2004/0177005 A1 | 9/2004 | Poltorak | |
| 2004/0193553 A1 | 9/2004 | Lloyd et al. | |
| 2004/0243490 A1 | 12/2004 | Murto et al. | |
| 2005/0138429 A1 | 6/2005 | Miura | |
| 2006/0144925 A1 | 7/2006 | Jones | |
| 2008/0010217 A1 | 1/2008 | Hobson et al. | |
| 2008/0010220 A1 | 1/2008 | Hobson et al. | |

OTHER PUBLICATIONS

Visa; Verified by Visa; 2005, USA, pp. 1.
Sankarson Banerjee, Senior Architect, Mphasis; Credit card security on the Net: Where is it today?; 2004, pp. 21-23.
Visa; How It Works; 2005, USA, pp. 1-2.
Mastercard International; Frequently Asked Questions About MasterCard SecureCode; 1994-2004, pp. 1-2.
Visa; Verified by Visa; 2005, USA, p. 1.
Sankarson Banerjee, Senior Architect, Mphasis; Credit Card Security on the Net: Where is it today?; 2004, pp. 21-23.
Visa; How it Works; 2005, USA, pp. 1-2.
Encorus Technologies; Mobile Payments Examples: M-Commerce Opens up a World of Opportunities; 2002, pp. 1-11.
George Walsh and Gabriel Berger, Director of Research & Development, DCTI E-Payment Services; Alternative Payment Methods; Aug. 2000, pp. 1-8.
Vivo Tech; RF-Based Contactless Payment: A Moret Convenient Way to Pay; 2003, pp. 1-25.
Mark E. Peters, IBM Corporation; Emerging eCommerce Credit and Debit Card Protocols; pp. 1-8.
Tony Hegarty, Eric Verheul, Dirk Steuperaert, & Georgia Skouma; Study on the Secuirty of Payment Products and Systems in the 15 Member States; Jun. 2003, pp. 1-124.

* cited by examiner

SYSTEM FOR INCREASING THE SECURITY OF CREDIT AND DEBIT CARDS TRANSACTIONS

TECHNICAL FIELD OF THE INVENTION

The present invention relates to a commercial transaction system, and more particularly to a system for allowing the use of credit or debit accounts while increasing the security of the transaction.

BACKGROUND OF THE INVENTION

Currently consumers who wish to use their credit or debit accounts must use a physical credit card or debit card and/or provide sensitive financial and personal data to a third party to initiate and complete the transaction. The consumer's account number and consumer credit card number are identical and are visible for theft by third parties or employees of third party merchants or financial institutions. As used herein, the term "card" will include both credit cards and debit cards.

Presently cards are constructed from plastic or polyvinyl chloride and contain a magnetic stripe on the back of the card. The cardholder's name is embossed on the front of the card along with the card's expiration date and the actual credit card number. The back of the card contains the magnetic stripe, a signature line, information on how to contact the card issuer and, possibly, the card number printed along with a three or four digit card verification number. The magnetic stripe may store up to three tracks of information, tracks one and two are typically read-only magnetic tracks, and track three is a read/write magnetic stripe. Tracks one and two have standard formatting as specified in the standard ISO/IEC 7813. Track three is formatted according to the standard ISO/IEC 4909.

Track one includes the information that is embossed on the front of the card, the account number, the cardholder's name and the expiration date of the card along with additional information such as the three digit service code (the first digit specifies the type of exchange permitted, the second digit specifies the authorization process required, and the third digit indicates the type of services available to the card), the country code possibly depending on the card number, and discretionary data. A check digit is included at the end of the first track as a verification of the data on track one.

Track two includes the same information as track one, excluding the cardholder's name and the discretionary data that is proprietary to the card issuer.

Track three includes the account number, sometimes the country code, and the card expiration date. Additionally track three may include up to two additional, subsidiary account numbers that may provide fallback authorization in case authorization is refused with the primary account. Track three has fields that may be updated, or written to by certain types of point of sale terminals. Track three thus offers the possibility of storing and updating financial parameters that control the cardholder's spending, or for control uses by the issuer.

Using the existing card methodology of having the same number for both the consumer account number and the consumer credit card number means that, in order to track a sales transaction, the merchant must store the consumer's credit card number. Recently there have been numerous publicized occurrences of merchants' consumer relationship management systems having been hacked by cyber thieves who have stolen consumer's credit card data. This potential for theft from the merchant increases the security risk, and liability, to both the consumer cardholder and the merchant.

In the case of a purchase that is completed verbally over a cell phone, fixed based telephone, IP phone or other means of verbal communication the consumer must orally relay his or her personal information in order to complete the purchase transaction. Transactions conducted over the Internet require the consumer to input the same information as required for a verbal order, which exposes the consumer to the possibility of the theft of the consumer's credit or debit card information and the consumer's personal data. Transactions where the card holder is not physically present are known as "card not present" or mail order/telephone order transactions. These types of transactions also include transactions that are conducted over the Internet.

Card Verification Value which is also known as CVC2 or Card Identification Number (CID) has been in use for over ten years. The system is basically a 3 digit or 4 digit number printed on the credit card separate from the actual credit card number and is not on the magnetic stripe. The merchant, whether via the Internet or telephone, asks for the number at the same time the card number is provided to the merchant. This number is then passed along to the verifying institution, which confirms that the card is in the presence of the cardholder. This method is subject to fraud, such as in the case of a criminal obtaining the credit card number may just as easily copy the verification number. When cards are swiped and thus stolen electronically then the verification number is copied at the time of the swiping and provided to whomever the card number is sold.

MasterCard's recent security enhancement, in response to consumer demand for greater security and privacy in card not present transactions, implemented a system MasterCard named "MasterCard SecureCode". This system requires that the consumer, in an Internet transaction, input a private code (that has been given to the consumer by the bank that issued the card) into a "pop-up" screen that appears on the merchant's web page when the consumer has notified the web page that the consumer has completed the order. The consumer then inputs his/her private code and the authentication value is then passed along to the issuing bank in the merchant's normal authorization process. Using the MasterCard SecureCode system thus eliminates the possibility of "one click" purchasing, requires that the merchant install a SecureCode compliant "plug-in" application on the merchant's web site, and still provides the merchant with the consumer's credit card and other personal data. This method, while improving security over the previously existing system, is cumbersome and does not accomplish the objective of keeping the consumer's card number and personal information hidden from the merchant and improve ease of use by the cardholder. This method does not allow for notification to the consumer of the purchase, nor does it add security or ease of use to transactions conducted verbally using a cell phone or land based telephone.

Visa's recent security solution is called "Verified by Visa" and using Three Domain security (3D or 3D-Secure), which operates by the cardholder inputting a personal identification number (PIN) into the merchant's web site when requested. This solution does not work on telephone sales (as the PIN would have to be verbally given to the merchant's call center employee) and is cumbersome to operate on the Internet.

The Verified by Visa process works in the following steps in an Internet transaction:
1. The cardholder enters payment details using the merchant's web page.
2. The cardholder is automatically directed to the card issuer's server, who generates a pop-up screen on the consumer's computer.

3. The issuer authenticates the cardholder via the cardholder inputting his/her PIN number of password.
4. The issuer then transmits to the cardholder a digitally signed approval, which is then retransmitted to the merchant's server to begin the normal credit approval process.

The normal credit approval process begins after the authentication process in order for the digital authorization from Visa to be included with the authorization request from the Merchant to Visa or, more likely, the authorization service for the card issuer.

Verified by Visa requires that the cardholder send the purchase authorization request from the consumer's computer to the merchant, who then sends the request to Visa's server, who then sends the request to the issuer's server. The issuer's server prompts for the password from the consumer, who then inputs the password or PIN, sends it to the issuer's server who then sends it to their (the issuer's) authentication server. The issuer's server then sends the approval to the consumer's computer who then passes the approval to the merchant's server. Then the merchant processes the payment for approval in the normal approval process and includes the authentication data along with the approval request to the card issuer for credit approval. Verified by Visa is cumbersome and will not work on telephone orders, and offers little compensation to consumers while taking more time to complete the transaction. Verified by Visa does not add the functionality of auto-filling forms on the Internet Merchant (or other merchants') customer relationship management systems, allow "one-click purchasing', ties up Visa, the merchant and the authorization entity's servers, increases communications between all of these servers, thus increasing the possibility of a communications error or drop, and still exposes the cardholder's data to theft.

Surrogate Card Numbers have been tried by American Express (Private Payments) and by MBNA (ShopSafe). The surrogate card number is basically a system where the consumer uses a software application to generate a one-time use credit card number that has a short validity period (normally two months or less) and a fixed charge value. The surrogate card number is tied to the consumer's "real" card number. This method is cumbersome (the consumer has to obtain the surrogate number and then keep track of it) and prevents the use of one click purchasing. Besides these issues, if surrogate numbers become widespread then, based on the current length of a credit card number (16 digits normally) there would soon be a shortage of numbers available. Of the 16 digits only 10 are available for actual account numbers as the other numbers designate the type of card, etc.

None of the above existing methods provide a solution that incorporates additional layers of security for both verbal and Internet transactions. Nor do any of the existing methods solve the combined problems of security, ease of use, and allow for one-click" purchasing. Nor do any of the existing methods improve the accuracy and speed of the remote sales type, mail order/telephone order, transaction. Several of the above methods require additional hardware to implement and many increase the volume of communications (and thus the possibility for information theft and communications break down).

Other proposed solutions require additional equipment, require that the transaction data be handled differently by either the consumer, the merchant or the financial institution and do not provide the increased security or speed of the sales transaction required by consumers.

Thus there exists a need for either a physical or virtual method of securing and enhancing credit and debit transactions, whether the transaction is conducted in person, on the Internet, over the telephone or via other communications methods available to the consumer.

SUMMARY OF THE INVENTION

In accordance with the present invention, a system for providing a secure method for storing and transmitting data required for a transaction between a consumer and merchant is made possible by the providing the consumer with both a consumer number, personal data and a credit or debit account number which may be encrypted. This information may be provided physically via a credit card type device, smart card type device and or virtually via the Internet, SMS text messaging, or other means of communicating with a consumer and his/her communications device. The present invention requires the issuance by the financial institution of two numbers, a credit card number and a related consumer account number.

BRIEF DESCRIPTION OF THE DRAWINGS

For a more complete understanding of the present invention and for further advantages thereof, reference is now made to the following Description of the Preferred Embodiments taken in conjunction with the accompanying Drawing in which.

DESCRIPTION OF THE PREFERRED EMBODIMENTS

The present invention provides a substantial additional layer of security to remote sales type transactions and card present transactions while allowing the use of the current credit, debit and other financial instrument approval process. The present invention provides the consumer with, in the case of a physical credit or debit card, a card identical in size and shape to the current card, with the addition of an additional credit account number to the card's magnetic stripe. The present invention also provides for the existence of an electronic card wherein there may not be a physical card. In the case of a wholly electronic "card" the same information that is provided on a physical credit or debit card is sent via the Internet, SMS text messaging or other method of communication to the consumer's cell phone, desktop computer, PDA, or other communications device for secure storage in a resident electronic wallet.

The additional number in accordance with the present invention replaces the credit card number that is currently assigned to the consumer. The existing credit card number (or a new number, if so determined by the issuer or consumer) becomes the consumer's account number and will be visible on the surface of the card. This consumer account number will be used by the consumer when inquiring about his/her bill, making card payments, making application for credit, and other times when necessary to provide evidence of the account. The merchant will use the consumer account number to track the transaction and activity with the cardholder for product returns, warranty work and other normal consumer and merchant issues.

The additional credit card number, which may be encrypted, is stored on the back of the credit card in the magnetic stripe and is not disclosed to the consumer and is not visible on the surface of the card. In the example of the virtual card, the encrypted credit card number (CCN) is pushed to the consumer's communications device (computer, PDA, cell phone, etc.) and is stored for use. The stored data, which may include all of the data currently stored on today's credit card, is used for online and other types of transactions.

An additional benefit of having two separate but related numbers is that the consumer account number may be used as a reference by the consumer when paying the bill, inquiring about a particular transaction or when following up with the merchant. The merchant is able to use the consumer account number to track the transaction and the consumer without having to have access to the actual credit card number.

An additional benefit of having two separate but related numbers is that the consumer/cardholder may use the consumer account number to provide a third party the information to send the cardholder funds. Disclosing the consumer account number does not open the door to a thief to transfer funds out of the cardholder's account, as the only way to charge or debit the cardholder's account is by using the credit card number, which is unavailable to the third party. The inflow of funds, using the consumer account number is similar to a one-way trap door. Funds are allowed in via the consumer account number but are not allowed out by use of the consumer account number. The only way charges may be made or funds transferred out are by use of the credit card number. Thus the present invention meets the demand of cardholders to safely and securely transfer funds to or from third parties over the Internet. The only requirement is for both the sender and receiver to have a dual account number activated account and to provide the sender with the consumer account number.

The dual account number information is sent to the cardholder via the Internet, SMS text messaging, Wi-fi, Bluetooth, and other methods of communications available to the specific device the cardholder wishes to store the dual account number information on. Thus the cardholder may have his or her dual account number account information stored on the cardholder's cell phone, notebook computer, desktop computer, PDA, and any other device that is equipped to store this data. The cardholder may wish to have a physical card issued to him/her, but the physical card would not be necessary.

When the financial institution that issues the dual account numbers sends the information to the cardholder's device the financial institution may also send the cardholder's name, mailing address, telephone number, fax number, email and other contact information that the cardholder's electronic wallet will store along with the account information. This additional information may be released upon approval by the cardholder to a merchant in an online, telephone, or other type of transaction to facilitate the transaction and eliminate the need for the cardholder to either have to verbally provide the information, in the instance of a telephone sale, or to have to input the data in the example of an Internet sale.

Figure 1:
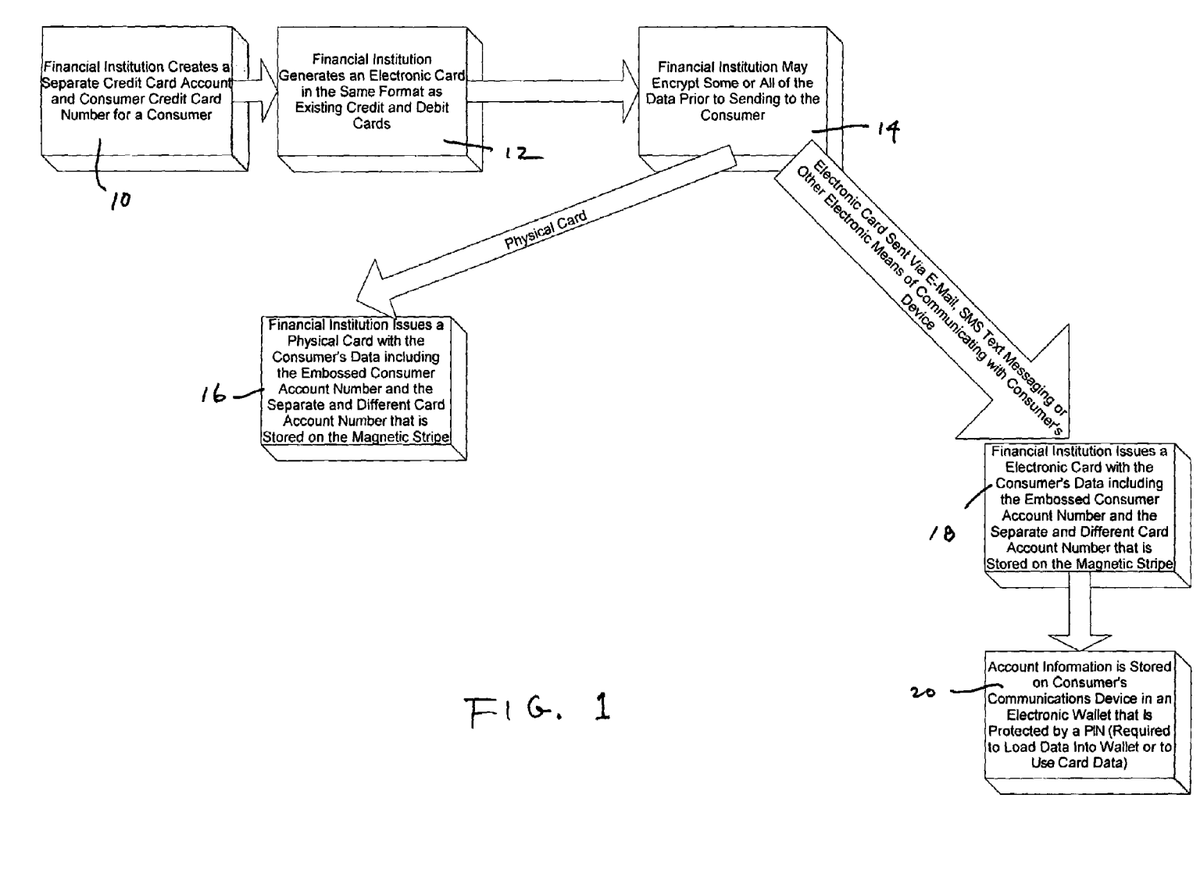
FIG. 1 is a block diagram of the present system.

Referring to FIG. 1, the present system is illustrated in which a card is issued by a financial institution. The financial institution creates a consumer account number and a related consumer credit card number for a consumer at block 10. An electronic card is generated at block 12 including a separate consumer account number and a related consumer credit card number for the consumer. At block 14, the financial institution may encrypt some or all of the data prior to sending the physical card or electronic card to the consumer. At block 16, the physical card is issued and includes an embossed consumer account number and the second number, related to the embossed consumer account number, in the form of a number encoded on a magnetic stripe on the card. In the electronic card format, at block 18, the financial institution issues the electronic card. At block 20, the account information is stored on the consumer's communications device.

Figure 2:
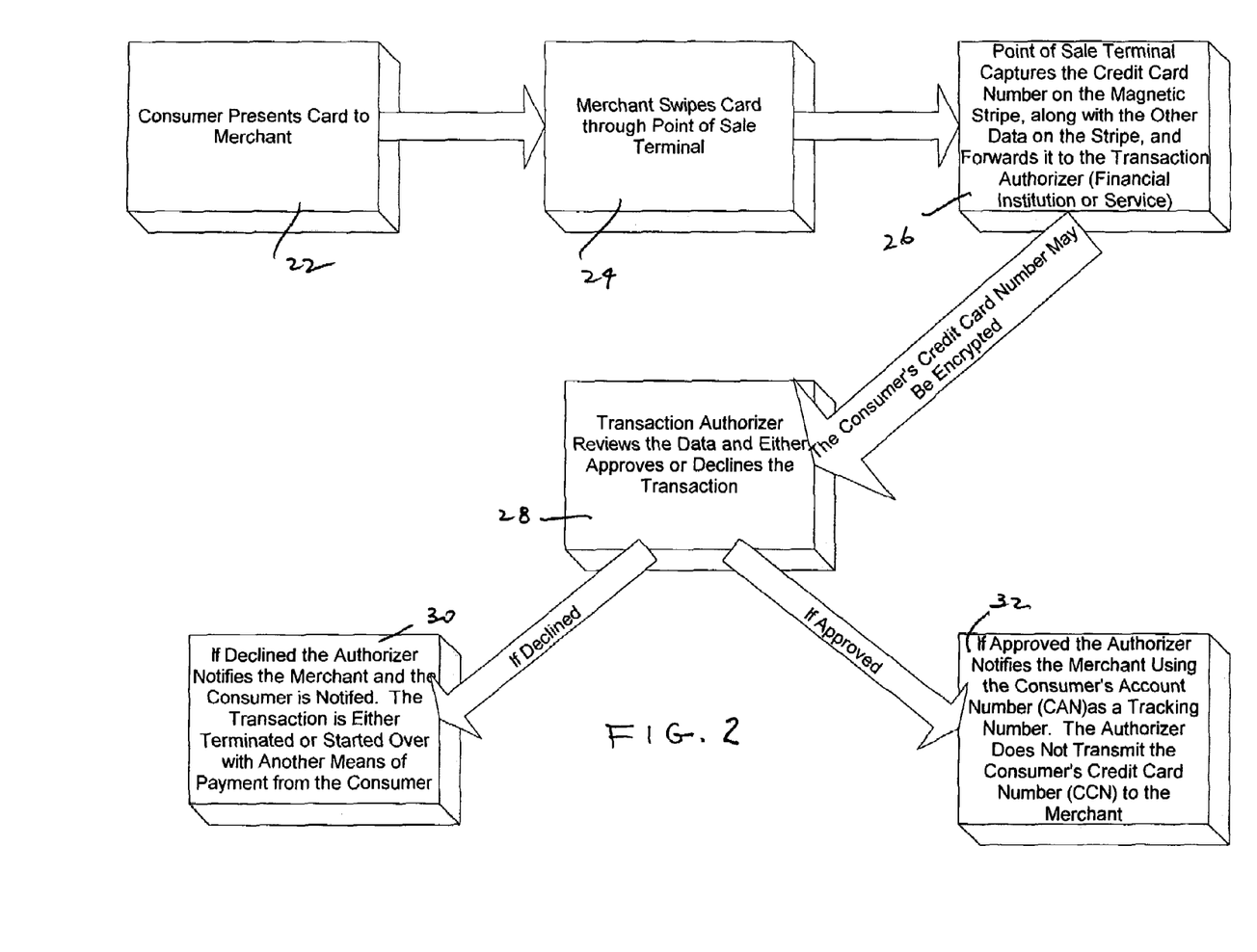
FIG. 2 is a block diagram illustrating a transaction process utilizing the present card at a point of sale terminal.

FIG. 2 illustrates a transaction process utilizing the present card at a point of sale terminal. At block 22, the consumer presents a card to a merchant. At block 24, the merchant swipes the card through a point of sale terminal. At block 26, the point of sale terminal captures the credit card number on the magnetic stripe and forwards this information to a transaction authorizer such as a financial institution or credit card service. At block 28, the transaction authorizer reviews the data and either declines the transaction at block 30 or approves the transaction at block 32. If approved, the authorizer notifies the merchant utilizing the consumer's account number as a tracking number, but does not transmit the consumer's credit card number, the second number, to the merchant.

Figure 3:
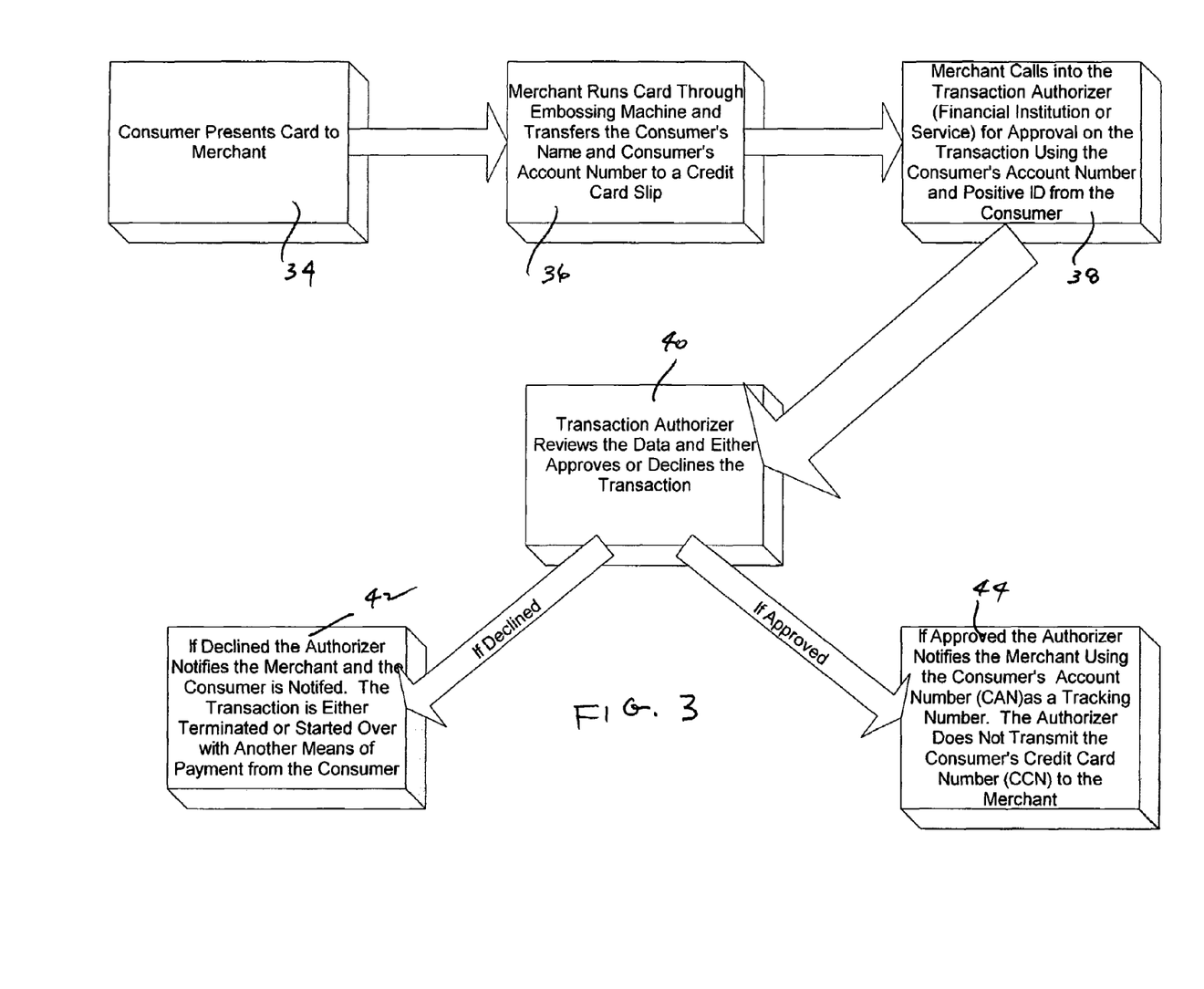
FIG. 3 is a block diagram illustrating a transaction process utilizing the present card for use with a credit card slip.

Referring to FIG. 3, a transaction process utilizing a credit card slip is illustrated. At block 34, the consumer presents a card to the merchant. At block 36, the merchant passes the card through an embossing machine and transfers the consumer's name and consumer's account number to a proper credit card slip. At block 38, the merchant calls the transaction authorizer for approval of the transaction using the customer's account number and positive identification from the consumer. At block 40, the transaction authorizer either declines or approves the transaction. The transaction is declined at block 42. If the transaction is approved, at block 44, the authorizer notifies the merchant using the consumer's account number as a tracking number. Again, the second number or consumer's credit card number is not passed on to the merchant.

Figure 4:
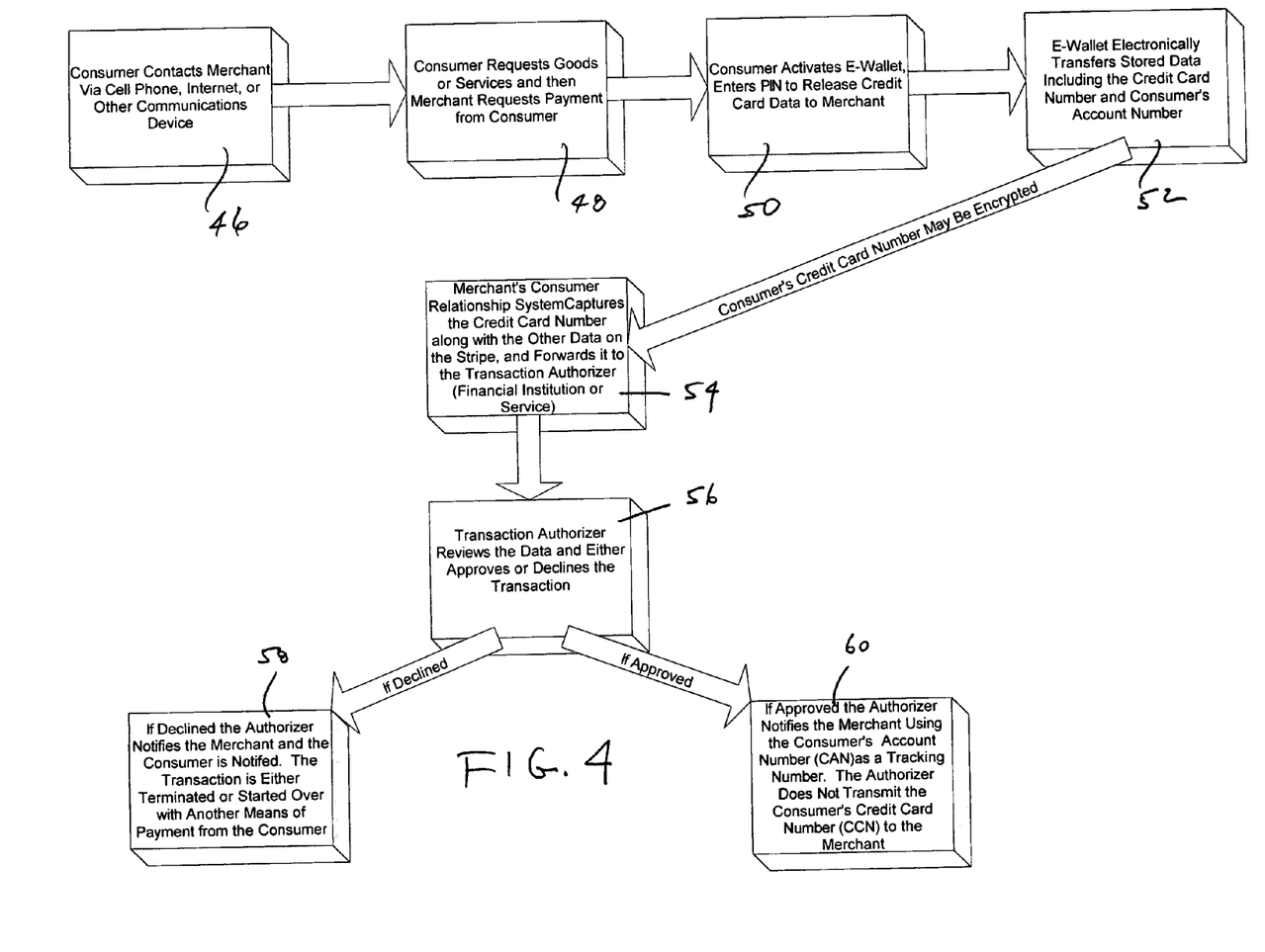
FIG. 4 is a block diagram illustrating a transaction process utilizing the present card in an electronic format.

Referring to FIG. 4, a process utilizing the present invention in the form of an electronic card is illustrated. At block 46, the consumer contacts a merchant via an electronic communications device. At block 48, the consumer requests goods or services from the merchant, and the merchant requests a form of payment. At block 50, the consumer activates the electronic communications device such as, for example, an E-wallet and enters a personal identification number to release credit card data to the merchant. At block 52, the electronically stored data including the credit card number and consumer's account number are transmitted to the merchant's consumer relationship system which captures the credit card number and consumer's account number. This information is forwarded to the transaction authorizer at block 56 which either declines at block 58 or approves at block 60 the transaction.

Figure 5:
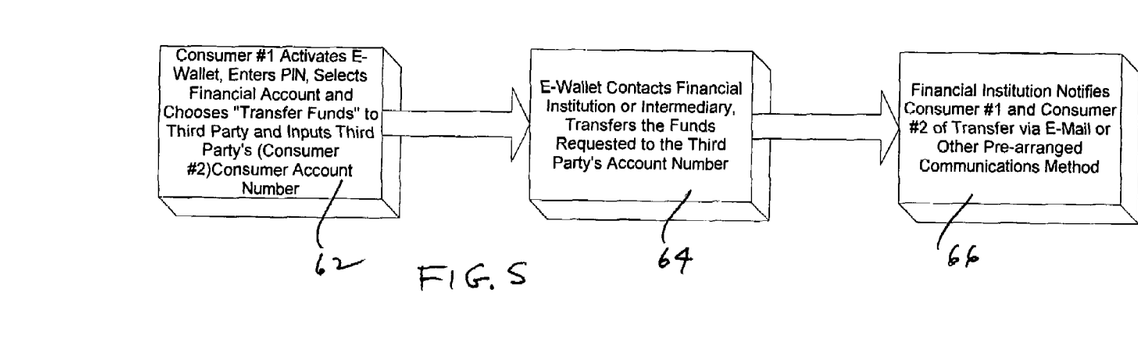
FIG. 5 is a block diagram illustrating the transfer of funds utilizing the present card in an electronic format.

FIG. 5 illustrates the steps in making a funds transfer utilizing the present invention. At block 62, a consumer activates an E-wallet and chooses to transfer funds to a third party by entering the third party's consumer account number. The E-wallet contacts the financial institution and requests that funds be transferred to the third party's account number. The financial institution notifies at block 66 consumer number 1 and consumer number 2 of the transfer. In accordance with the present invention, neither consumer number 1's nor consumer number 2's credit card number is visible to either party.

Figure 6:
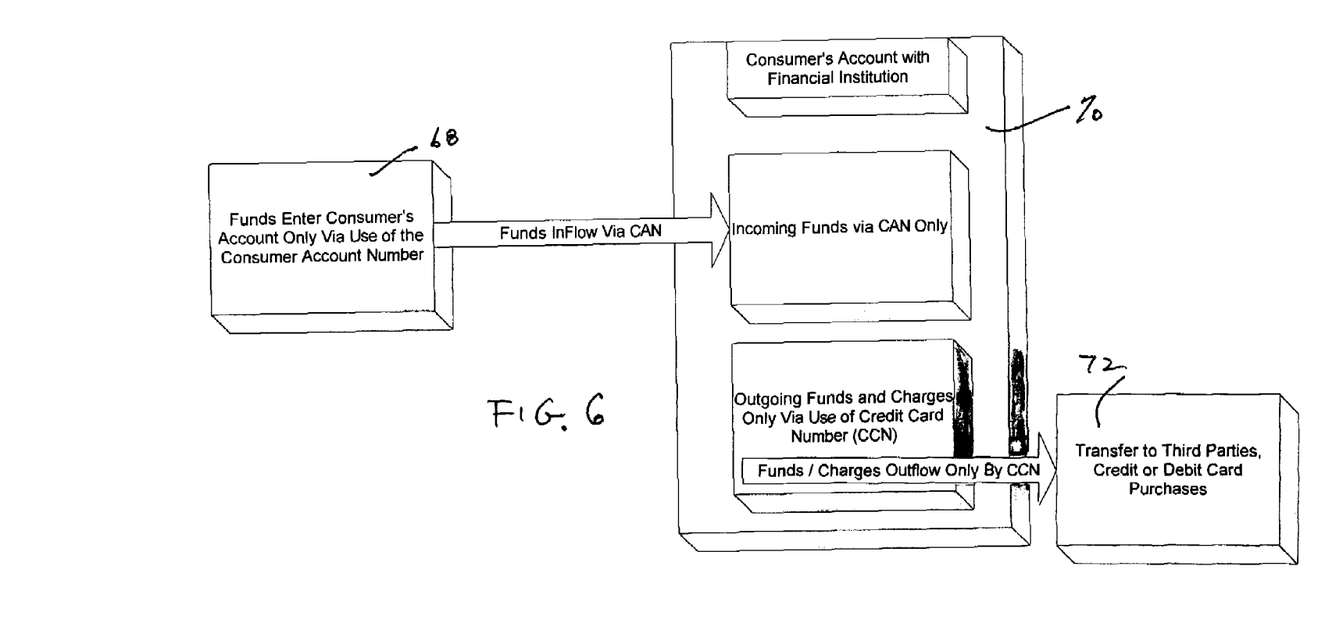
FIG. 6 is a block diagram illustrating the transfer of funds utilizing the present invention.

FIG. 6 illustrates the flow of funds during a transfer process utilizing the present card. At block 68, funds enter a consumer's account using only the consumer account number. Funds flow into the financial institution at block 70 utilizing the consumer account number. Funds flow out of the financial institution at block 70 to be transferred to a third party at block 72 utilizing the consumer credit card number.

Other alteration and modification of the invention will likewise become apparent to those of ordinary skill in the art upon reading the present disclosure, and it is intended that the scope of the invention disclosed herein be limited only by the broadest interpretation of the appended claims to which the inventor is legally entitled.

The invention claimed is:

1. An apparatus, comprising:
   a card;
   a first number visibly disposed on the card and associated with a financial account of a consumer with a financial institution, the first number configured to enable a merchant to track a transaction with the consumer using the first number, but not for seeking authorization to fund the transaction with the financial account; and
   a storage medium embodied by the card, to store a second number associated with the financial account, the second number distinct from the first number, and for use in authorizing funding the transaction with the financial account, wherein the second number is configured to be unknown to the merchant;
   wherein the first number is restrictively associated with the second number to enable deposit of funds into the financial account, but not withdrawal of funds from the financial account.

2. The apparatus of claim 1, wherein the second number is further configured to be unknown to the consumer.

3. An apparatus, comprising:
   a storage medium; and
   an electronic wallet stored in the storage medium and configured to store a first number and a second number distinct from the first number, the first number associated with a financial account of a consumer with a financial institution,
   wherein the first number is selected to enable a merchant to track a transaction with the consumer using the first number without use of the first number to obtain authorization to fund the transaction with the financial account, and
   wherein the second number is selected for use in authorizing funding of the transaction from the financial account of the consumer, and the second number is unknown to the merchant;
   wherein the first number is restrictively associated with the second number to enable deposit of funds into the financial account, but not withdrawal of funds from the financial account.

4. The apparatus of claim 3, wherein the first and second stored numbers are provided to the electronic wallet electronically.

5. The apparatus of claim 4, wherein the second number is not disclosed to the consumer.

6. The apparatus of claim 3, wherein the apparatus is a smart card.

7. The apparatus of claim 3, wherein the apparatus is a computer, personal digital assistant, or a cell phone.

8. The apparatus of claim 3, wherein the electronic wallet is further configured to store additional consumer information including at least one of the consumer's name, mailing address, telephone number, facsimile number, or email address.

9. A method, comprising:
   receiving by a merchant from a consumer a second number as a result of the consumer attempting to enter into a transaction with the merchant, the second number associated with a financial account of the consumer, and the second number received by the merchant in an encrypted form;
   the merchant requesting authorization for the transaction, based at least in part on the second number;
   the merchant receiving authorization for the transaction;
   the merchant receiving a first number associated with the financial account, the first number different from the second number, and not used for authorizing funding of the transaction with the financial account; and
   the merchant tracking the transaction based at least in part on the first number;
   wherein the first number is restrictively associated with the second number to enable deposit of funds into the financial account, but not withdrawal of funds from the financial account.

10. The method of claim 9, wherein receiving the second number comprises reading the second number off a card using a point of sale machine, and receiving the first number comprises manually reading the first number off the card.

11. The method of claim 9, wherein receiving the first and second numbers comprises receiving the first and second numbers electronically from an electronic wallet disposed on an electronic device of the consumer.

12. The method of claim 9, wherein requesting authorization comprises requesting authorization from a transaction authorizer, other than a financial institution providing the first and second numbers and the financial account.

13. The method of claim 9, wherein receiving authorization comprises receiving authorization from a transaction authorizer, other than a financial institution providing the first and second numbers and the financial account.

14. The method of claim 9, wherein requesting authorization comprises requesting authorization from a financial institution providing the first and second numbers and the financial account.

15. The method of claim 9, wherein receiving authorization comprises receiving from a financial institution providing the first and second numbers and the financial account.

16. A method, comprising:
    receiving from a merchant a request to authorize a transaction with a consumer, the request including a second number associated with a financial account of the consumer, the second number unknown to the consumer and the merchant, and the financial account having an associated first number;
    wherein the first number is restrictively associated with the second number to enable deposit of funds into the financial account, but not withdrawal of funds from the financial account;
    authorizing or denying the transaction, based at least in part on the received second number, but not the first number; and
    debiting or crediting the financial account if the transaction is authorized.

17. The method of claim 16, further comprising tracking the debiting or crediting of the financial account using the first number.

18. The method of claim 16, further comprising providing the first number to the merchant if the transaction is authorized.

19. A method, comprising:

generating by an account issuer a first number for identifying a financial account of a consumer;

providing the first number to the consumer for use by a merchant engaged in a transaction with the consumer to track the transaction using the first number, but not for obtaining authorization to fund the transaction with the financial account;

generating by an account issuer a second number associated with the financial account, distinct from the first number, for use in authorizing funding of the transaction with the financial account;

providing an encrypted form of the second number to the consumer; and relating by the account issuer the first number and the second number;

wherein the account issuer allowing deposit into the financial account by restrictively reference to the first number, but not funding of the transaction from the financial account by restrictively reference to the first number.

* * * * *